PROCESS FOR PRODUCING TEXTURED YARN

Original Filed March 17, 1969 2 Sheets-Sheet 1

PROCESS FOR PRODUCING TEXTURED YARN

Original Filed March 17, 1969 2 Sheets-Sheet 2

United States Patent

Re. 28,406
Reissued May 6, 1975

28,406

PROCESS FOR PRODUCING TEXTURED YARN

Michel Buzano, Villeurbanne, France, assignor to Rhone-Poulenc-Textile S.A., Paris, France

Original No. 3,772,747, dated Nov. 20, 1973, Ser. No. 84,131, Oct. 26, 1970, which is a division of Ser. No. 814,465, Mar. 17, 1969. Application for reissue Apr. 22, 1974, Ser. No. 463,138
Claims priority, application France, Mar. 18, 1968, 144,238
Int. Cl. D02j *1/22*
U.S. Cl. 28—72.17 6 Claims

Matter enclosed in heavy brackets [ ] appears in the original patent but forms no part of this reissue specification; matter printed in italics indicates the additions made by reissue.

ABSTRACT OF THE DISCLOSURE

Fancy yarns are made by subjecting yarns of a synthetic thermoplastic material, especially polyester yarns, to partial stretching, e.g. by a factor of 1.5–3.5, in contact with an aqueous lower alkanol or other crack-producing agent, followed by a heat relaxatior treatment, the said or other heat treatment, or a supplementary stretch, being applied intermittently or to a continuously varying degree. The yarns obtained have a flake appearance and comprise alternating thick and thin portions, the diameters of the thick and thin portions both varying macroscopically, and the thick parts varying in diameter on the microscopic scale, the zones of smallest diameter corresponding to zones of highest crystallinity and orientation. The thin parts may vary in diameter microscopically in an analogous way but with smaller variations, or may be substantially uniform.

CROSS REFERENCE TO RELATED APPLICATION

Figure 1:
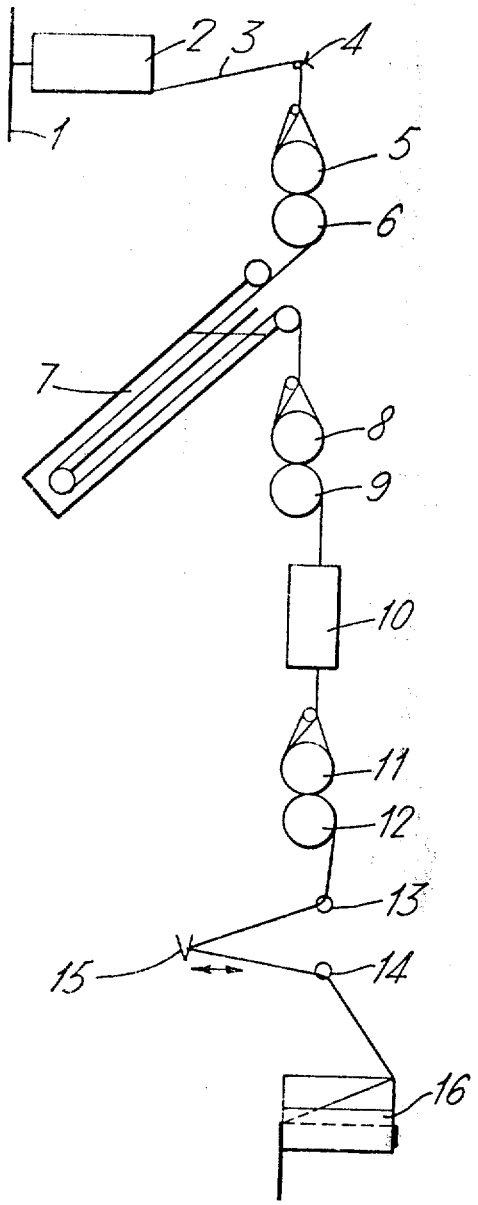

This application is a division of my application Ser. No. 814,465, filed Mar. 17, 1969, now U.S. Pat. No. 3,683,610.

This invention relates to a new product consisting of a fancy yarn of a synthetic thermoplastic material resembling a so-called flake yarn, and to a process and device for obtaining it. Preferably the yarn is of a polyester such as polyethylene terephthalate.

A standard technique for the manufacture of synthetic flake yarn consists of under-stretching the yarns in zones, that is to say of stretching them in zones to a lesser degree, than corresponds to a fully stretched yarn. In this method, the stretching force is not applied to the yarn uniformly, so that the diameter of the finished yarn varies along its length.

While this method usually gives good results with polyamide yarns, in the case of polyester yarns the under-stretched parts become brittle and fragile when heat-treated, and this is a major disadvantage.

The present invention provides a new multifilament yarn of a synthetic thermoplastic material, in which each filament prossesses, on a macroscopic scale, alternations of thick and thin parts in phase, the diameters of the thick and thin parts varying over the length of the yarn in such a way as to give it a flake appearance.

This new yarn is characterized in that the thick parts comprise on a microscopic scale alternating zones of at least two different diameters, the zones of the lowest diameter corresponding to the zones having the highest crystallinity and molecular orientation and vice versa, and the thin parts comprise on a microscopic scale the same alternations of zones and the same differences of structural characteristics but to a much lower degree with the possibility that the differences can become imperceptible; in other words, these thin parts can in the extreme case be in the form of normally stretched parts which are crystalline, oriented and of uniform cross-section.

On the macroscopic scale the thick parts have a spiral three-diamensional crimp and a high apparent volume.

It is advantageous for the thick parts to show, on a microscopic scale, an alternation of zones of pronouncedly different diameters, the essentially amorphous and un-oriented zones giving the yarn great flexibility.

Preferably, in the case of polyethylene terephthalate, the most amorphous zones in the thick parts have a crystallinity index of less than 20 percent. This crystallinity index is deduced from the measurement of the overall crystallinity index of the yarn as determined according to the method of W. O. Statton (Journal of Applied Polymer Science, Vol. 7, Pages 803–815 (1963)), from the proportions by volume of the various zones, from the X-ray diagram given by the yarn, from comparisons of fluorescence after dyeing of the various zones of one and the same yarn of several yarns, and from the morphology of these zones.

The invention also consists in new process for obtaining flake yarns from filaments of a synthetic thermoplastic material, especially polyester material, which comprises partially stretching the yarn in contact with a crack-producing agent and then giving it a heat treatment in the relaxed state, and continuously or intermittently varying the degree of relaxation during such a heat treatment and/or the degree of stretching during the initial or a supplementary stretching treatment. A supplementary stretching may be carried out in the cold.

In one method of carrying out the invention the yarn, after being stretched in a bath of a crack-producing agent, is given a supplementary stretching to a degree which varies with time, and is then given a heat treatment in the relaxed state.

In another method the yarn is first given a heat treatment in the relaxed state and is then partially stretched to a varying degree.

In yet another method the yarn, after being partially stretched in a bath of a crack-producing agent, is given a heat treatment in a relaxed state, the degree of relaxation varying continuously or intermittently in a regular or random manner.

It is sometimes particularly advantageous to combine two of the above methods, for example the yarn can be given a heat treatment while it passes continuously from a relaxed state to a stretching state.

Known crack-producing agents can be used, e.g. alcohols, glycols, dimethyl-formamide, kerosene, perchloroethylene, polyoxyethylenic liquids of the "Carbowax" type pyridine and the like. Such compounds have frequently been described in the literature. Preferably, relatively cheap agents such as aqueous solutions of lower alcohols are used.

In the case of a polyester yarn, especially a polyethylene terephthalate yarn of a usual gauge, the degree of stretch in a crack-producing bath is advantageously between 1.5 and 3.5, and especially between 2.5 and 3.

The degree of relation and of any subsequent stretching will vary according to the effect desired.

The heat treatment can be effected by any known means, including treatment with steam or with hot air, or contact with a heating surface.

The various operations of the process may be carried out on a continuous or a discontinuous basis. In the latter case the time elapsing between stretching in a crack-producing bath and the relaxation and/or subsequent stretching under varying tension responsible for the formation of the flakes is immaterial, and when a supplementary stretching is followed by heat treatment in the relaxed state these two operations may be separated.

Since the time interval between the treatments is of no importance, the heat treatment can take place for example during a subsequent yarn treatment stage, or on the finished woven or other fabric.

The invention consists also in a device for carrying out the above process, which comprises means for feeding a yarn to a bath, means for stretching it in the bath, means for heat treating the stretched yarn and means for relaxing and/or continuously or intermittently varying the degree of relaxation during such a heat treatment or the degree of stretch during the initial or a supplementary stretching treatment, and means for winding up the resulting fancy yarn.

This device may be constructed as a single unit or divided into several elements.

The heat treatment means may consist of any known means such as a hot air box or heating plate or an equivalent thereof.

The device for varying the degree of relaxation and/or stretching may consist simply of a moving finger forming part of, or carried or operated by, a cam driven by a motor, usually a variable speed motor, and of two sets of rollers of which the second is controlled to run at a different peripheral speed than the first. Of course this device can be replaced by any equivalent mechanism without going outside the scope of the invention.

The invention is illustrated in the accompanying drawing, in which

Figure 2:
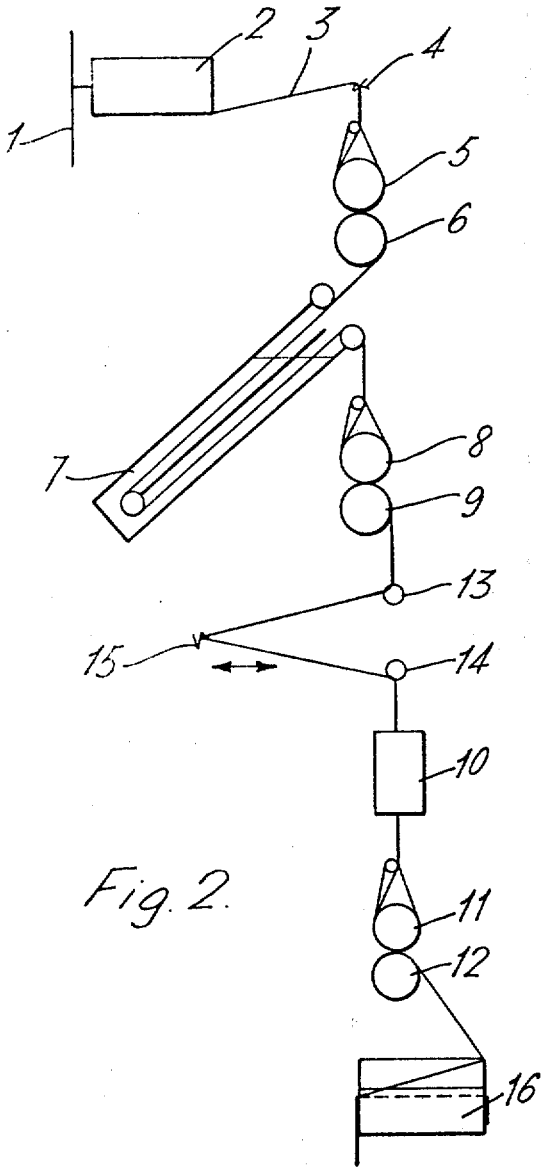

FIG. 1 is a schematic view of a device for carrying out the process continuously, and FIG. 2 is a schematic view of a variant of this device.

Referring now to FIG. 1, the device comprises a creel 1 that carries a bobbin 2 from which yarn 3 is drawn off by a system of rollers 5, 6, passing through a wire loop 4.

The yarn 3 is thereafter stretched in a crack-producing bath contained in a vat 7, from which it is drawn by the rollers 8, 9.

The resulting yarn is thereafter treated in a hot air box 10 from which it is drawn by the rollers 11, 12.

The yarn then undergoes a second stretching by means of a system consisting of the two snubbing elements provided by eyelets 13 and 14 and a moving finger 15. The yarn is finally taken up by a wind-up mechanism 16.

In the variant of FIG. 2 the variable stretching device is arranged upstream from the set of rollers 11, 12 and either upstream or downstream from the heating box 10.

In the examples which follow the polyethylene terephthalate used has an intrinsic viscosity in o-chlorophenol of the usual value for textile yarns, about 0.65.

EXAMPLE 1

A 66 filament polyethylene terephthalate yarn of filament denier 7 is stretched in the device of FIG. 1, using an aqueuos bath containing 25 percent of ethanol at 40° C., with a degree of stretch of 3.

The peripheral speed of the feed rollers 8, 9 is 510 m./minute, that of the relaxing rollers 11 and 12 is 163 m./minute and the winding up speed is 258 m./minute. The temperature of the heating box is 120° C. The moving finger reciprocates 110 times per minute.

A flake yarn is obtained in which the thick parts have a gauge of 320 denier and the thin parts a gauge of 180 denier.

The shrinkage in boiling water is 41.7 percent for the thin parts and 17.7 percent for the thick parts.

The shrinkage in boiling water is determined as follows: a length of yarn A is first measured under a load of 0.05 g./den., then dipped into boiling water for 2 minutes, and dried for half an hour in an oven at 100° C. The yarn is now suspended for 15 minutes and is then subjected to a load of 0.05 g./den., and a new length B is measured.

The shrinkage in boiling water is given by the ratio $(A-B)/A \times 100$.

EXAMPLE 2

The same yarn and the same device as before are used, but the speeds of the feed rollers and relaxing rollers are respectively 234 m./minute and 81 m./minute, the temperature of the oven is 160° C., and the winding up speed is 144 m./minute.

The moving finger reciprocates 76 times per minute.

A yarn of the following characteristics is obtained:

| | Thin parts | Thick parts |
|---|---|---|
| Denier | 156 | 350 |
| Shrinkage in boiling water, percent | 25 | 2.8 |

EXAMPLE 3

Still using the same polyethylene terephthalate yarn, an assembly is used in which the stretching finger is arranged between the oven 10 and the set of rollers 11 and 12, the operating details being:

| | |
|---|---|
| Speed of yarn feed rollers m./minute | 234 |
| Speed of relaxation rollers m./minute | 130 |
| Oven temperature ° C | 155 |
| Reciprocations per minute | 48 |

A yarn is obtained in which the thick parts have a gauge of 410 denier and the thin parts a gauge of 200 denier.

EXAMPLE 4

A 44 filament polyethylene terephthalate yarn of filament denier 7 is used, this time arranging the stretching finger between the set of feed rollers 8 and 9 and the oven 10 as shown in FIG. 2.

The linear speeds of the feed rollers and relaxing rollers are respectively 20 m./minute and 148 m./minute, the temperature of the hot air oven is 155° C., and the moving finger reciprocates 160 times per minute.

The resulting yarn has the following characteristics:

| | Thin parts | Thick parts |
|---|---|---|
| Elongation at break in percent | 56 | 141 |
| Gauge in denier | 100 | 190 |

The yarns of the invention have good dyeing affinity which is demonstrated as follows: a knitted fabric is produced from a standard polyethylene terephthalate yarn and from a flake yarn according to the present invention, and is dyed by immersing it in a bath at 40° C. containing the following, by weight:

0.3 percent of Disperse Orange 11 (C.I. 60,700)
0.6 percent of Disperse Violet 1 61,000 (C.I. 61,100)
3.5 percent of Disperse Blue 7 (C.I. 62,500)

1 cm.$^3$/litre of oxyethylated castor oil as a dispersing agent, 1 cm.$^3$/litre of acetic acid as an acidifying agent; the temperature of the bath is then raised at the rate of one degree per minute to 98° C., the bath is kept at this temperature for 90 minutes and then cooled slowly, and the fabric is rinsed. The standard yarn is hardly stained, but the flake yarn is perfectly dyed.

EXAMPLE 5

The same yarn is used as in Example 4 but this time the assembly employed is such that the stretching finger is located between the bath 7 and the set of rollers 8 and 9, the characteristics of the resulting yarn are essentially the same.

The yarns of the invention are particularly valuable because they combine softness properties, even after subsequent heat treatment, with an excellent dyeing affinity. Furthermore they can be easily obtained by a process operating directly after and continuously with extrusion spinning.

I claim:

1. A process for the production of continuous filament polyester fancy yarns having improved softness and dyeing properties, comprising subjecting an initially unstretched continuous filament polyester yarn first to partial stretching by a factor of 2.5–3.5 x in a bath of a crack-producing agent and then to a supplementary stretch in the absence of such agent by a continuously varying factor, and before or after the supplementary stretch giving the yarn a relaxing heat treatment while allowing it to shrink.

2. A process according to claim 1, in which in the first stage the yarn is stretched by a factor of 2.5–3 x.

3. A process according to claim 2, in which the second stretching stage is effected in the air and in the cold.

4. A process according to claim 2 in which a polyethylene terephthalate yarn is treated.

5. A process according to claim 1, in which the second stretching stage is effected in the air and in the cold.

6. A process according to claim 1, in which a polyethylene terephthalate yarn is treated.

References Cited

The following references, cited by the Examiner, are of record in the patented file of this patent or the original patent.

UNITED STATES PATENTS

| | | | |
|---|---|---|---|
| 2,932,850 | 4/1960 | McNeill et al. | 28—71.3 |
| 3,102,323 | 9/1963 | Adams | 264—290 |
| 3,115,437 | 12/1963 | Adams | 161—179 |
| 3,117,173 | 1/1964 | Adams | 264—290 |
| 3,184,369 | 5/1965 | Haseley | 161—179 |
| 3,185,613 | 5/1965 | Adams | 161—179 |
| 3,212,158 | 10/1965 | Kasey | 28—72.17 X |
| 3,439,489 | 4/1969 | Holton et al. | 161—179 X |
| 3,587,221 | 6/1971 | Buzano | 161—179 X |
| 3,611,521 | 10/1971 | Corbiere | 28—71.3 |

LOUIS K. RIMRODT, Primary Examiner

U.S. CL. X.R.

57—140 J; 161—173, 179